(12) United States Patent
Nucci et al.

(10) Patent No.: US 7,945,658 B1
(45) Date of Patent: May 17, 2011

(54) METHOD FOR REAL-TIME VISUALIZATION OF BGP ANALYSIS AND TROUBLE-SHOOTING

(75) Inventors: Antonio Nucci, Burlingame, CA (US); Soon-Tee Teoh, San Jose, CA (US); Chen-Nee Chuah, Davis, CA (US)

(73) Assignee: Narus, Inc., Sunnyvale, CA (US)

( * ) Notice: Subject to any disclaimer, the term of this patent is extended or adjusted under 35 U.S.C. 154(b) by 934 days.

(21) Appl. No.: 11/294,764

(22) Filed: Dec. 5, 2005

(51) Int. Cl.
G06F 15/16 (2006.01)
G06F 15/173 (2006.01)

(52) U.S. Cl. ........ 709/224; 709/223; 709/238; 709/239; 370/238

(58) Field of Classification Search .................. 709/224; 370/238
See application file for complete search history.

(56) References Cited

U.S. PATENT DOCUMENTS

| | | | | |
|---|---|---|---|---|
| 5,825,775 | A * | 10/1998 | Chin et al. | 370/401 |
| 2003/0174653 | A1* | 9/2003 | Basu et al. | 370/238 |
| 2004/0170124 | A1* | 9/2004 | De Clercq et al. | 370/229 |
| 2004/0221296 | A1* | 11/2004 | Ogielski et al. | 719/313 |
| 2005/0091399 | A1* | 4/2005 | Candan et al. | 709/238 |
| 2006/0291446 | A1* | 12/2006 | Caldwell et al. | 370/351 |
| 2007/0129826 | A1* | 6/2007 | Kreidler et al. | 700/83 |

OTHER PUBLICATIONS

Soon Tee Teoh, Ke Zhang, Shih-Ming Tseng, Kwan-Liu Ma, S. Felix Wu "Combining Visual and Automated Data Mining for Near-Real-Time Anomaly Detection and Analysis in BGP" Oct. 29, 2004 Washington, DC ACM.*
S T. Teoh, K L. Ma, S F. Wu, D Massey, X L. Zhao, D Pei, L.Wang, L Zhang, and R Bush, Visual-based anomaly detection for BGP origin AS change (OASC) events (2003) Self Managing Distributed Systems, 2867, pp. 155-168.*
Wong T., Van Jacobson, Alaettinoglu, C. "Internet Routing Anomaly Detection and Visualization" Pub Date Jun. 28-Jul. 1, 2005 pp. 172-181 IEEE.*
J.Wu Z.M. Mao, J. Rexford, J. Wang, "Finding a Needle in a Haystack: Pinpointing Significant Bgp Routing Changes in an IP Network", NSDI 2005.*
J.Wu, Z.M. Mao, J.Rexford, J.wang, "Finding a Needle in a haystack: pinpointing Significant BGp Routing Changes in an IP Network", NSDI 2005.*

* cited by examiner

*Primary Examiner* — Nathan Flynn
*Assistant Examiner* — Jason Harley
(74) *Attorney, Agent, or Firm* — Fernandez & Associates, LLP

(57) ABSTRACT

The present invention comprises a multi-tier system. Major goals of the system are to 1) clearly visualize BGP dynamics and alert/report important deviation of BGP dynamics to avoid overwhelming the operators with too much information and 2) analyze the root cause of the problems by using a multi-tier approach, with a light-computational analysis and high-level classification for a real-time problem identification followed by a more rigorous off-line analysis for a further and more detailed trouble shooting. An example embodiment is provided that comprises four modules. The first module comprises a distributed family of collectors in charge of collecting real-time network information. The second module filters out non-relevant prefixes and extracts and profiles key features of the network information. The third module monitors BGP activity from both an Internet-AS and single-AS perspectives by displaying the data in real time and highlighting major shifts or divergence from historical baselines with comprehensive layouts. The forth module is run off-line to focus on a few relevant events that are selected through the first three modules. This is usually a time-consuming phase of the process due to the different temporal and/or spatial correlation that must be run across several sets of data. During this phase, the system can spend more time to better identify the real cause of the problem.

34 Claims, 8 Drawing Sheets

| Step | Policy |
|---|---|
| 1 | Ignore if the next hop is unreachable |
| 2 | Highest Local Preference |
| 3 | Shortest AS path |
| 4 | Lowest Origin Tupe |
| 5 | Lowest MED among routers from same AS |
| 6 | eBGP routes over iBGP routes |
| 7 | Lowest IGP cost ("Hot-Potato routing") |
| 8 | Lowest router ID |

Figure 1

METHOD FOR REAL-TIME VISUALIZATION OF BGP ANALYSIS AND TROUBLE-SHOOTING

BACKGROUND

1. Field

The present invention relates to computer networks. More particularly, the present invention relates to Internet and method for real-time visualizing of BGP (Border Gateway Protocol) analysis and trouble-shooting. In the context of this document the term "BGP" shall mean what is understood by a person skilled in the art of computer networks.

2. Description of Related Art

The Internet consists of many separate Administrative Systems (AS) that manage their networks independent of each other. In the context of this document the term "Administrative System" shall mean what is understood by a person skilled in the art. Internet functionality depends heavily on the operation of routers, which forward each packet towards its destination based on local information. Any performance degradation of routing protocol leads to a decrease in the overall performance of the Internet. Therefore, a primary concern for network operators, those who manage and maintain Internet domains, is the relatively smooth operation of the series of network domains that comprise the Internet.

The Border Gateway Protocol (BGP) (Y. Rekhter, T. Li, S. Hares, "A Border Gateway Protocol 4", (BGP-40. Internet Draft draft-ietf-idr-bgp4-26.txt), Work In Progress, October 2004) is the routing protocol that ASes use to exchange information about how to reach destination address blocks. These destination address blocks are termed "prefixes" by person skilled in the art. Three aspects of BGP are important:

1) Path-vector protocol: Each BGP advertisement includes a list of ASes along the path, along with other attributes such as next-hop IP address. By representing the path at the AS level, BGP hides the details of the topology and routing inside each network.

2) Incremental protocol: A router sends an advertisement of a new route for a prefix or a withdrawal when the route is no longer available. Every BGP update message is indicative of a routing change, such as an old route disappearing or a new route becoming available.

3) Policy-oriented protocol: Routers can apply complex policies to influence the selection of the best route for each prefix and to decide whether to propagate this route to neighbors. Knowing why a routing change occurs requires understanding how policy affects the decisions. To select a single best route for each prefix, a router applies the decision process illustrated in FIG. 1 to compare the routes learned from BGP neighbors. In backbone networks, the selection of BGP routes depends on the interaction between three routing protocols: External BGP (eBGP}, Internal BGP (iBGP} and Interior Gateway Protocol (IGP). In the context of this document the terms "eBGP, iBGP, IGP" shall mean what is understood by a person skilled in the art. The border routers at the periphery of the network learn how to reach external destinations through eBGP sessions with routers in other ASes. A large network often has multiple eBGP sessions with another AS at different routers. This is a common requirement for two ASes to have a peering relationship. After applying local policies to get the eBGP-learned routes, a border router selects a single best route and uses iBGP to advertise the route to the rest of the AS. In the simplest case, each router has an iBGP session with every other router inside the AS (i.e. a fully-mesh topology). The routers inside the AS run IGP to learn how to reach each other. The two most common IGPs are OSPF and IS-IS, which compute shortest paths based on configurable link weights. The routers use the IGP path costs in the seventh step in FIG. 1 to select the closest egress point. The decision process in FIG. 1 is important to compare two routes based on their attributes.

Being one of the universally deployed major Internet protocols, the performance of BGP in terms of convergence, survivability and stability has huge impacts on the overall performance of the Internet. It is widely held by persons skilled in the art that high volumes of BGP routing updates, knows as BGP churns, coupled with slow convergence behavior of BGP can cause severe rippling instability across large portions of the Internet. For instance, BGP instability may lead to transient routing loops or loss of reachability for traffic destined for a certain network prefix. A link failure in a remote AS could trigger a shift in how traffic travels through a network, perhaps causing congestion on one or more links. High volumes of updates may overload router CPUs and cause router "melt-downs", thereby leading to disruptions in traffic forwarding, etc. Ensuring good performance in an IP backbone network requires continuous monitoring to detect and diagnose problems, as well as quick responses from management systems and human operators to limit the effects on end users of Internet. In the context of this document, the term "operator" shall mean a human operator of a network management system in general unless specified otherwise.

Several approaches have been proposed on root-cause analysis of BGP routing changes: M. Caesar, L. Subramanian and R. Katz "Towards localizing root causes of BGP dynamics" Tech. Rep. CSD-03-1292, UC Berkeley, November 2003, D. Chang, R. Govindan and J. Heidemann "The temporal and topological characteristics of BGP path changes" Proceedings of IEEE ICNP, November 2003, A. Feldmann, O. Maennel, Z. Mao, A. Berger and B. Maggs, "Locating Internet routing instabilities", Proceedings of ACM Sigcomm, August 2004, M. Lad, A. Nanavati, D. Massey and L. Zhang, "An algorithmic approach to identifying link failures", Proceedings of Pacific Rim Dependable Computing, 2004, T. Wong, V. Jacobson and C. Alaettinoglu, "Making sense of BGP", Nanog presentation, February 2004, K. Xu, J. Chandrashekar, Z. L. Zhang, "A First Step Toward Understanding Inter-Domain Routing Dynamics", ACM Sigcomm 2005 Workshop on Mining Network Data, August 2005. These studies analyze streams of BGP update messages from several vantage points throughout the Internet, i.e., views from several routers in different ASes, with the goal of inferring the cause and location of routing changes. Although these approaches are interesting because they can answer important questions like "identification of ASes that are involved in the same problem and a very detailed analysis of the problem", they lack considerations of what really matters to an operator, i.e. the view of their specific AS. On the other hands, in J. Wu, Z. M. Mao, J. Rexford, J. Wang, "Finding a Needle in a Haystack: Pinpointing Significant BGP Routing Changes in an IP Network", NSDI 2005, the authors proposed a new approach for root-cause analysis that analyzes BGP routing changes seen inside a single AS in order to identify and quantify the effects of these changes on that specific network. Combining these two methodologies in a real system would be of tremendous help for any operator across the globe.

All methods belonging to the two families of approaches described above suffer two serious limitations described as follows. First, they produce "cold" textual reports that try to explain and justify events that happen behind the scenes.

Current operators have to sit through these "large" reports to gain insight into their networks. This procedure is time-consuming and inefficient.

Second, most of the approaches offer only an off-line capability for data analysis. Although this is still of huge help to operators, detecting and reporting problems in real-time is mode productive due to the fact that operators can react earlier to a problem in progress avoiding to be exposed later on to major problems. The only work that claims to be able to process a large amount of BGP messages in real-time is presented in J. Wu, Z. M. Mao, J. Rexford, J. Wang, "Finding a Needle in a Haystack: Pinpointing Significant BGP Routing Changes in an IP Network", NSDI 2005. We believe that some steps of their methodology, like grouping BGP events into BGP clusters, should be moved into a different module that has enough time to run more complex aggregation and analysis on the data to better qualify the anomaly and avoid introducing delay into the system.

Meanwhile, several visualization tools were proposed as an alternative to the approaches mentioned above. These visualization tools gained a lot of attention from the community due to their capability to give the user the possibility to develop an accurate vision of what is normal on their own network so that they can diagnose problems better. Although these tools represent a good start for detecting a problem, they lack the feature of classifying the anomalous events and pointing out directions or giving suggestions to the users of what their most likely causes are. In the context of this document, the term "user" means a user of a network management tool unless specified otherwise. In this definition a user may or may not be an operator which is a human operator of a network management system in general.

Several visualization tools have been proposed to monitor BGP dynamics in real time. In one existing system BGPlay, which maps BGP path attributes to an AS graph by L. Colitti, G. Di Battista, I. De Marinis, F. Mariani, M. Pizzonia, and M. Patrignani, Bgplay, when the user starts BGPlay, a query window appears, where the user enters the prefix and time interval. The BGPlay server then queries the database for all updates to the specified prefix during the specified time interval. An animation window displays routing activity of the specified prefix. The left part of the animation window shows a histogram which plots the number of events over time on a logarithmic scale. The main part of the window contains the AS graph. Each number represents an AS, and the originating AS is colored red. If the user clicks on an AS, its name and description is shown. Each line represents an AS path. Each path starts from the originating AS and stops at the AS of a RIS peer. The dashed lines represent paths that did not change during the query interval, while the solid lines represent paths that did change. Each solid path is drawn with a unique color for identification purpose.

Another system that also maps BGP attributes to an AS graph is LinkRank: M. Lad, D. Massey, and L. Zhang, "Linkrank: A graphical tool for capturing bgp routing dynamics", Proceedings of the IEEE/IPIF Network Operations and Management Symposium NOMS, April 2004. In a LinkRank graph, the weight of an inter-AS link is determined by the number of prefixes having an AS path that includes that link. In a Rank-Change graph, the weight on each link is the difference between the LinkRank of that link over time. A negative weight indicates routes lost on a link, while positive weight indicates routes gained in that time period.

Another similar system is the TAMP graph (T. Wong, V. Jacobson, and C. Alaettinoglu, "Internet routing anomaly detection and visualization", Proceedings of the 2005 International Conference on Dependable Systems and Networks DSN'05, pages 172-181, 2005) which shows how many prefixes are carried over an AS-AS link. At the bottom is an animation clock, displaying the time into the incident currently being shown. The plot to the right of the controls shows how the number of prefixes varied with time on whichever edge is selected in the TAMP graph. The edge colors indicate how the routes are changing: black means not changing; blue means the edge is losing prefixes; green means the edge is gaining prefixes; yellow means the prefix count is flapping too fast to animate; and an edge that has lost prefixes also has a gray shadow that indicates the largest number of prefixes it ever carried. The thickness of the non-gray part of an edge is proportional to the number of prefixes it is currently carrying. The Elisha system (S. T. Teoh, K.-L. Ma, S. F. Wu, and X. Zhao, "Case study: Interactive visualization for internet security", Proceedings of the IEEE Visualization Conference 2002, pages 505-508, 2002) also contains network visualization of BGP updates. In this system, all the paths from the AS at the observation point to the originating AS of the IP prefix is plotted. This system also allows animation over time, so that at each frame, all the AS paths used in the time interval is displayed. The color represents the time (less recently or more recently) the path was used within the currently-displayed time window. These existing systems focus only on basic information, i.e. BGP updates, and do not give any deeper insight into the problem.

Therefore what is needed is a system and method that establish a real-time interaction between end-users and network traffic such that users can gain insight of both network dynamics and hidden traffic patterns.

SUMMARY OF THE INVENTION

The present invention comprises a multi-tier system. An example embodiment comprises four modules. Although this system uses only one vantage point for BGP data collection, it can be easily extended to collect and process data from multiple vantage points. Therefore the example embodiment is used to illustrate the present invention but is not intended to define or limit the invention. Major goals of the system are to 1) clearly visualize BGP dynamics and alert/report important deviation of BGP dynamics to avoid overwhelming the operators with too much information and 2) analyze the root cause of the problems by using a multi-tier approach, with a light-computational analysis and high-level classification for a real-time problem identification followed by a more rigorous off-line analysis for a further and more detailed trouble shooting.

The first module comprises a distributed family of collectors in charge of collecting in real-time network information including but not limited to Netflow/Cflowd, BGP, IGP (Interior Gateway Protocol), router configurations and sys-log files. In the context of this document the terms "Netflow/Cflowd, BGP, IGP (Interior Gateway Protocol), router configurations and sys-log files" shall mean what is understood by a person skilled in the art. All data are moved to a single, centralized location, called master collector that has a global view of the network behavior. Next, data are sent to the second module called Analyzer. The Analyzer first filters out certain non-relevant prefixes so as to focus the analysis on the few prefixes that matter to the operator. Secondly, the Analyzer extracts and profiles key features including but not limited to BGP events, routing (from a single and multiple routers), and Network Traffic. These meta-data are then forwarded to the visualization module that is in charge of monitoring BGP activity from both an Internet-AS and single-AS perspectives. The visualization module displays in real-time several kinds of information including but not limited to BGP updates, BGP event, router views, and prefix status. The visualization module displays in real time the data and highlights major shifts or divergence from historical baselines (provided by the Analyzer) with comprehensive layouts.

Requirements of the visualization tool are: 1) scalability, i.e. the identification and extraction of key BGP features to monitor and visualize in order to process a large set of data at very fine time-scales, 2) efficiency, i.e. graphical layouts to easily direct user's attention to an anomaly, and 3) readability, i.e. the layouts must be clear and easy to be consulted in the case of large network deployment, i.e. large number of nodes and links. As soon as an anomaly is visualized on the display, the tool interacts with the user to further trouble-shoot the problem observed using a more thorough analysis.

At this point the system uses the forth module. This is usually a time-consuming phase of the process due to the different temporal and/or spatial correlation that must be run across several sets of data. This module runs off-line and is focused on a few relevant events that are selected through the first three modules. As a consequence, the system can spend more time to better identify the real cause of the problem. Moreover, the user can automatically activate the Trouble-shooter module at a user specified interval for a periodic report.

Another important characteristic of the system is its capability to play-back data through animation gathered from a previous time interval. This time interval is called play-back window in the context of this document. This feature can be used by the operator for a deep off-line forensic analysis of BGP behavior in order to better investigate the origin of the problem and study its propagation over time. The play-back window for the play-back operation can be defined by the operator and its size is strictly related to the amount of data the system is able to store, i.e. its memory or its storage facility in general.

The novelty of the present invention includes, but is not limited to, the capability of the system in general and of the visualization module in specific to incrementally and efficiently identify and report a cause of a problem in a large scale network without being overwhelmed by the large amount of network information.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIG. 1 is a high-level block diagram illustrating BGP decision process.

DETAILED DESCRIPTION OF THE INVENTION

FIG. 1 is a high-level block diagram illustrating BGP decision process. Routers can apply complex policies to influence the selection of the best route for each prefix and to decide whether to propagate this route to neighbors. Knowing why a routing change occurs requires understanding how policy affects the decisions. To select a single best route for each prefix, a router applies the decision process illustrated in FIG. 1 to compare the routes learned from BGP neighbors.

Figure 2:
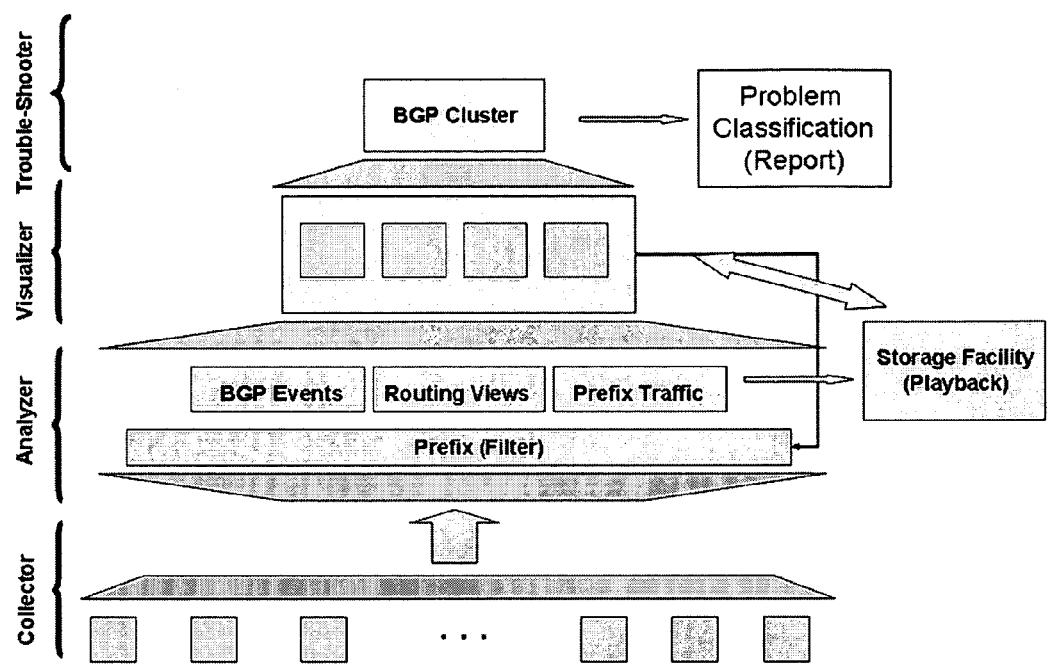
FIG. 2 is a high-level block diagram illustrating the system architecture of an example embodiment of the present invention.

FIG. 2 is a high-level block diagram illustrating the system architecture of an example embodiment of the present invention. The architecture comprises four major modules: 1) Collector, 2) Analyzer, 3) Visualizer and 4) Trouble-shooter. Several software agents acting as slave collectors collect BGP, Netflow/Cflowd, IGP and syslogs files from all border routers and forward the information to a master collector which is a centralized system that has a unified view of the network topology and data in real time. These collectors pre-process the data and build in memory both an eBGP and an iBGP network topologies used for further analysis. The eBGP, iBGP, and IGP topologies can be displayed by the Visualizer module in real-time. The data are then forwarded to the Analyzer in charge of 1) extracting meaningful information for analysis, i.e. key features, 2) baselining critical statistics from the key features and 3) generating alerts whenever a deviation from normal behavior is detected. All these information are processed in real-time and is used to feed the Visualizer. The Visualizer takes the statistics generated by the Analyzer and displays them using scalable and easy-to-consult layouts. Goals of the Visualizer are to monitor the network behavior from a BGP perspective and to highlight network anomalies. An approach of incremental deep-dive into the problem is available through its several display panels with optimized graphic layout. At this point, operators have the option to classify the specific anomaly detected by applying a more sophisticated analysis to the data. This way it can avoid operator getting overwhelmed by a large amount of information wherein data relating to anomalies are masked by data from the period of normal behavior, for which heavy analysis is not required. The Trouble-shooter module diagnoses the problem in detail using data from a time interval when the problem was experienced. The system in the example embodiment of the present invention can process data gathered from more than one time interval, e.g. the last n time intervals, if enough memory is available in the system. Moreover, every time the Trouble-shooter module is called, a report is generated to the operator and delivered as a ticket. Moreover, the Trouble-shooter can also playback the data for a deep off-line forensic of BGP behavior to better investigate the origin of the problem and its propagation over time. The historical data can be displayed through all the graphic layouts in the Visualizer. The play-back window can be defined by the operator and its size is strictly related to the amount of data the system is able to store, i.e. its memory or storage facility in general.

Each module of the example embodiment of the present invention is described in greater detail as follows.

The Collector module continuously collects different BGP information produced by the router(s). These BGP information include, but are not limited to, routing table, updates, withdrawals, errors, keep alive and other protocol related events. All the above data are forwarded to a centralized master collector that has a unified vision of the network, i.e. the master collector receives all data from slave collectors and forward these events to the Analyzer for further analysis and correlation. Moreover, the Collector also starts to collect the alert information from the routers. The alert information collected from the routers includes, but is not limited to, Netflow events, Cflowd events, SNMP events/traps, syslog events, routers configuration, routing table configuration, and the like. In the context of this document the terms "Netflow events, Cflowd events, SNMP events/traps, syslog events, routers configuration, routing table configuration" shall mean what is understood by a person skilled in the art. The alert information collected from the routers, as well as the BGP information, are then exported to the Analyzer for equal aggregation, correlation and base-lining.

The main functions of the Analyzer are to 1) extract and analyze key metrics that are of interest to the operators, 2) baseline the key metrics such to promptly generate alerts in case of divergence from normal behavior and 3) identify effects and infer possible causes of the problem experienced. What is important is the approach illustrated in the Visualizer of an example embodiment of the present invention to baseline and alert. Any other algorithms for anomaly detection can be incorporated into the system. The example embodiment does not limit the scope of the present invention.

The first operation done by the Analyzer is to apply a filter on the collected prefixes. Only prefixes that match the requirements of the filter will be forwarded into the system for further analysis. The filter can be enabled in two different ways based on 1) network traffic, 2) instability/stability, 3) prefix mask and 4) any combination of the above. An operator has the option to focus on only the few prefixes that carry the majority of network traffic. These prefixes, indeed, are the most critical for traffic engineering since a shift in the associated routing can lead to major network/link congestion, i.e. overloading of one or more links in the network. It has been shown in previous works (for example see S. Agarwal, C. Chuah, S. Bhattacharyya, C. Diot, "Impact of BGP Dynamics on Intra-Domain Traffic", ACM Sigmetrics, June 2004) that only a few prefixes carry a large majority of network traffic. These prefixes have also shown to be quite stable over time. These prefixes are called in literature "elephants" while the other remaining prefixes are called "mice". By analyzing only this specific subset of prefixes an operator can tightly focus on the information that really matters for traffic engineering. As soon as the option is enabled, a filter is applied. All prefixes are sorted by their network traffic. The majority of "mice" prefixes are filtered out while only the "elephants" are considered by the system in the analysis. The threshold to differentiate the two families (mice and elephants) can be selected by the operator. The second option of the filter allows the operator to focus the analysis only on prefixes that have been stable during a time window in the past. The time window can be selected by the operator. The stability of a prefix is learned through the system of the present invention and the information is stored in memory. Focusing the analysis on historically unstable prefixes can be time consuming and can be of limited interest to the operator. In the third option, a prefix mask can be selected independently of network traffic or stability. Only the prefixes matching the mask will be considered by the system. In the last option, the filter allows the operator to combine the three metrics above for a deeper analysis on selected few prefixes. All these four filter options can be enabled by an operator at any point in time and in any module of the system. These four filters are described here to illustrate this embodiment of the present invention. What is important is the filter approach illustrated here. Any other filters can be incorporated into the system. The example embodiment does not limit the scope of the present invention.

The Analyzer extracts several key metrics from the data that give a multi-tier visibility of BGP behavior. This multi-tier approach allows the operator to select a proper level of detail for analysis. The extracted metrics are grouped into the following four families: BGP updates, BGP events, BGP event classification: Single and Multiple Border Router View and Network-to-Prefix Traffic Vector. These metrics are illustrated further as follows.

1) BGP updates: Every time a route change is experienced, a new BGP update is generated. A large number of BGP updates can represent a serious problem for operators because they could potentially overwhelm routers and cause congestion in the network. Operators have the option to monitor and analyze specific statistics associated with the concept of BGP updates. Example of some statistics that are provided by the Analyzer are: 1) number of BGP updates originated by a specific AS, 2) distribution of BGP updates per prefix or per border router, 3) number of BGP updates carried by each AS-AS link and 4) distribution of inter-arrival times of BGP updates per prefix or per border router.

2) BGP events: A single network disruption, such as a link failure or policy change can trigger multiple BGP messages as part of the convergence process: C. Labovitz, R. Malan and F. Jahanian, "Internet routing instability", Proceedings of ACM Sigcomm, 1997, "Origin of Internet routing instability, "Proceedings of IEEE Infocom, 1999.

The intermediate routes are short-lived in somewhat arbitrary fashion, since they depend on subtle timing details that drive how the routers explore alternate paths. Operators have the option in removing the transitory behavior associated with BGP updates and analyze BGP behavior in a more stationary regime. For this purpose, a first level aggregation is incorporated into the analysis by adopting the same concept of BGP event widely used in the past: M. Caesar, L. Subramanian and R. Katz "Towards localizing root causes of BGP dynamics. Tech" Rep. CSD-03-1292, UC Berkeley, November 2003, D. Chang, R. Govindan and J. Heidemann "The temporal and topological characteristics of BGP path changes", Proceedings of IEEE ICNP, November 2003, A. Feldmann, O. Maennel, Z. Mao, A. Berger and B. Maggs, "Locating Internet routing instabilities", Proceedings of ACM Sigcomm, August 2004, O. Maennel and A. Feldmann, "Realistic BGP traffic for test labs", Proceedings of ACM Sigcomm 2002, J. Wu, Z. M. Mao, J. Rexford, J. Wang, "Finding a Needle in a Haystack: Pinpointing Significant BGP Routing Changes in an IP Network", NSDI 2005. A BGP event is defined as a sequence of BGP updates for the same prefix from any border router where the inter-arrival time is less than a predefined event-timeout. Since there is the risk that certain prefixes never converge to a stable path due to persistent routing instabilities, it is important to set an upper bound of maximum duration allowed for any route to converge. This is defined as convergence-timeout. Previous studies e.g. J. Rexford, J. Wang, Z. Xiao and Y. Zhang, "BGP routing stability of popular destinations", Proceedings of Internet Measurement Workshop, 2002 suggests indicative values of 70 seconds for the event-timeout and 600 seconds for the convergence-timeout. These values are used in an embodiment of the present invention. The Analyzer collects and aggregates BGP updates into BGP events, according to the above definition, and baselines key statistics like: 1) number of BGP events originated by a specific AS, 2) distribution of BGP events per prefix or per border router, 3) number of BGP events carried by each AS-AS link and 4) identification of destination prefixes that have unstable routes, i.e. correlation over time. This information can be easily extracted by tracking the number of BGP events for the same prefix over time. What is important is the approach of using aggregation to remove the transitory behavior of network information. Additional BGP related statistics can be added into the system. The example embodiment does not limit the scope of the present invention.

3) Classification of BGP routing events: Single and Multiple Border Router View: Another important aspect of the data to look at is how each border router reaches a specific prefix over time. Indeed, although a border router may generate a BGP update or BGP event for a specific prefix at a specific point in time, it may either undergo a transient routing change only to return to the same stable best route or change to a new route. Operators have the option in tracking closely the status of specific prefixes or routers over time. The following describes the concept of routing vector proposed by J. Wu, Z. M. Mao, J. Rexford, J. Wang, "Finding a Needle in a Haystack: Pinpointing Significant BGP Routing Changes in an IP Network", NSDI 2005. Let B={B1, B2, . . . , BN} be the set of border routers of the specific AS that deployed our system. Let P={P1, P2, . . . , PM} the set of all admissible prefix. Let Rji(t) be the best route selected by the border router Bj to reach destination prefix Pi at time t. Each route Rji(t) is represented by a two entry vector <nhopji, flagji>(t), where the entry [nhopji](t) corresponds to the next-hop address of the eBGP neighbor router. Since a border router Bj may select Rji(t) from a route learned via iBGP from another border router, this information is captured in the entry flagji flagji=i in case the best route is learned via iBGP or flagji=e in case the best route is learned via eBGP. With this definition the evolution of the routing vector RVi(t)=<R1i(t), R2i(t), . . . , RNi(t)> for any specific prefix Pi in P can be tracked in time. With this approach, operators gain insight of the routing status, i.e. how each border router reaches a specific prefix over time. From a single border router perspective, BGP events can be classified into several categories, e.g.:

a) No Change: The router Bj may undergo a transient routing change only to return to the same best route. More generally, the BGP route may change in some attribute that is not captured by Rji(t). For this scenario, traffic entering the network at border router Bj destined to the prefix Pi would continue to flow through the AS in the same way (nhopj,oldi=nhopj,newi and flagj,oldi=flagj,newi).

b) Internal/External Path Change: An Internal path event may cause a router to switch from one egress point to another (Internal Path Change). In this case, router $B_j$ uses iBGP-learned route before and after the routing change ($\text{flag}^{j,old}_i=\text{flag}^{j,new}_i=i$) but with a different next-hop router ($\text{nhop}^{j,old}_i \neq \text{nhop}^{j,new}_i$). An external event may cause a router to switch between eBGP-learned routes with different next-hop AS. In this case, the ($\text{flag}^{j,old}_i=\text{flag}^{j,new}_i=e$) while the next hop changes, i.e. ($\text{nhop}^{j,old}_i \neq \text{nhop}^{j,new}_i$).

c) Loss/Gain of Egress Point: An external event may cause a route to disappear, or be replaced with a less attractive alternative, forcing a border router to select an iBGP route (Loss of Egress Point). In this case, a router $B_j$ has ($\text{nhop}^{j,old}_i= \text{nhop}^{j,new}_i$). but $\text{flag}^{j,old}_i=e$ while $\text{flag}^{j,new}_i=i$. On contrast, an external event may cause a router to switch between eBGP-learned routes with different next-hop ASes. In this case, a router $B_j$ has ($\text{nhop}^{j,old}_i= \text{nhop}^{j,new}_i$) but $\text{flag}^{j,old}_i=i$ while $\text{flag}^{j,new}_i=e$.

The Analyzer provides time-series information regarding the total number of BGP events per event type as discussed in the classification above. This information can be displayed either for a specified set of prefixes or all prefixes. Same information can be displayed either for a specific border router or all border routers. Moreover, as previously proposed by J. Wu, Z. M. Mao, J. Rexford, J. Wang, "Finding a Needle in a Haystack: Pinpointing Significant BGP Routing Changes in an IP Network", NSDI 2005, it might be important to correlate different views from multiple border routers. This way operators can identify which border routers have similar views of the problem and which routers do not. A multi-border router view can be categorized as the following example:

a) Distant/Transient Disruption: A BGP event is classified as belonging to this family if and only if each element of its routing vector is of type "No Change". These events do not have any influence on the flow of traffic through the AS. A transient disruption may cause temporary routing changes before the border routers converge back to the original BGP routes. These events are worthwhile to report because the downstream routing change may affect the end-to-end performance (e.g., by changing the round-trip time for TCP connections) and the convergence process may lead to transient performance problems that can be traced to the routing event.

b) Internal Disruption: A BGP event is classified as belonging to this family if and only if the change of each of the elements in its routing vector is either of type "No Change" or type "Internal Path Change" with at least one element undergoing an "Internal Path Change". Caused by a change in the IGP topology or an iBGP session failure, these events are important because they may cause a large shift in traffic as routers switch from an egress point to another.

c) External Disruption: A BGP event is classified as belonging to this family if and only if only one element of its routing vector has a change of type "Loss of Egress Point", "Gain of Egress Point" or "External Path Change". Typically, an ISP has eBGP sessions with a neighboring AS at multiple geographical locations, making it interesting to highlight routing changes that affect just one of these peering points.

d) Multiple External Disruptions: A BGP event is classified as belonging to this family if and only if multiple elements of its routing vector have a change of type "Loss of Egress Point", "Gain of Egress Point" or "External Path Change".

e) Loss/Gain of Reachability: A BGP event is classified as belonging to the family "Loss of Reachability" if and only if every element of its routing vector with an external route experiences a "Loss of Egress Point". Similarly, a BGP event is classified as belonging to the family "Gain of Reachability" if and only if every element of its routing vector with an external route experiences a "Gain of Egress Point". A loss of reachability is extremely important because it may signify complete loss of connectivity to the destination addresses, especially if the routers have no route for other prefixes (e.g., supernets). A gain of reachability indicates a possible problem if the network does not normally have routes for that prefix (for example, an AS that mistakenly starts advertising a large number of small subnets).

With this type of information, operators can cluster BGP events of the same type across prefixes to infer the real cause of a network problem, i.e. correlation across destination prefix space. Also for this family, the Analyzer provides the same basic statistics as described above.

4) Network-to-Prefix Traffic Vector: The last key feature is represented by the Network-to-Prefix Traffic Vector which allows the operator to estimate the traffic impact of the routing changes and then to focus only on problems having the most significant impact to traffic engineering. The Analyzer aggregates the Netflow data collected on the outgoing links to compute prefix-level traffic statistics. For each destination prefix, the Analyzer generates a traffic weight that corresponds to the percentage of traffic destined to that prefix across the overall traffic volume in the network. The weights allow the operator to estimate the potential impact of occurrence of routing events we have discussed previously. Although the traffic over a link changes over time, we compute the weight across a sliding window (e.g. last month). This metric can be used in conjunction with the above features.

Goals of the Visualizer are to present in real-time the evolution of the key features extracted by the Analyzer, so as to alert by drawing operator's attention to an anomaly and to indicate the possible causes of the anomaly. One embodiment of the present invention is a graph-based visualization of BGP routing changes. The Visualizer offers two different views of BGP Dynamics: Internet-AS View and Home-Centric View. The Internet-AS View studies the activity among ASes in terms of BGP updates and BGP events exchanged among ASes. This view helps the operator to understand 1) the Internet stability over time, i.e. number of BGP updates and BGP events generated across different ASes, 2) to highlight which ASes are involved in a problem and 3) how the problem is propagating through the entire Internet. Moreover, this view can also help the operator in identifying which ASes are most unstable over time in order to qualify peers or revise peering agreements. The Home-Centric View is designed to allow an operator to understand the BGP behavior inside a specific AS. Operators want to track the health of their AS over time, i.e. tracking the number of BGP updates and BGP events generated and received, and incrementally gain knowledge of details like 1) which border routers are involved in the problem, 2) which destination prefixes are causing the problems and lastly 3) which border routers and destination prefixes anomalies might be caused by the same major network event.

In one embodiment of the present invention, the panels and layouts of "Internet-AS View" only displays the of BGP updates. Same panels and layouts are used to display information about BGP events in the other embodiment. Moreover, operators can choose to display the above information in terms of traffic involved. When this option is selected, BGP updates and BGP events are weighted using the ratio of Network traffic computed by the Analyzer.

The Visualization module in the present invention is novel in several ways including but not limited to: 1) it shows both an Internet-AS and Home-Centric view with both BGP updates and BGP events. Previous works do not provide information regarding BGP events, nor do they provide information like number of BGP update and BGP events carried over each link, nor do they show the number of BGP update and BGP events originating from each AS; 2) it is able to profile key features over time (Exponential Weighted Moving Average) for selected ASes and to show the point in time when a divergence from baseline is observed; 3) it is able to deep-dive into the problem displaying information never shown before including but not limited to BGP events per single and multiple border routers, prefix status and prefix instability; 4) it is able to breakdown BGP events per classification type or per border router.

Figure 3:
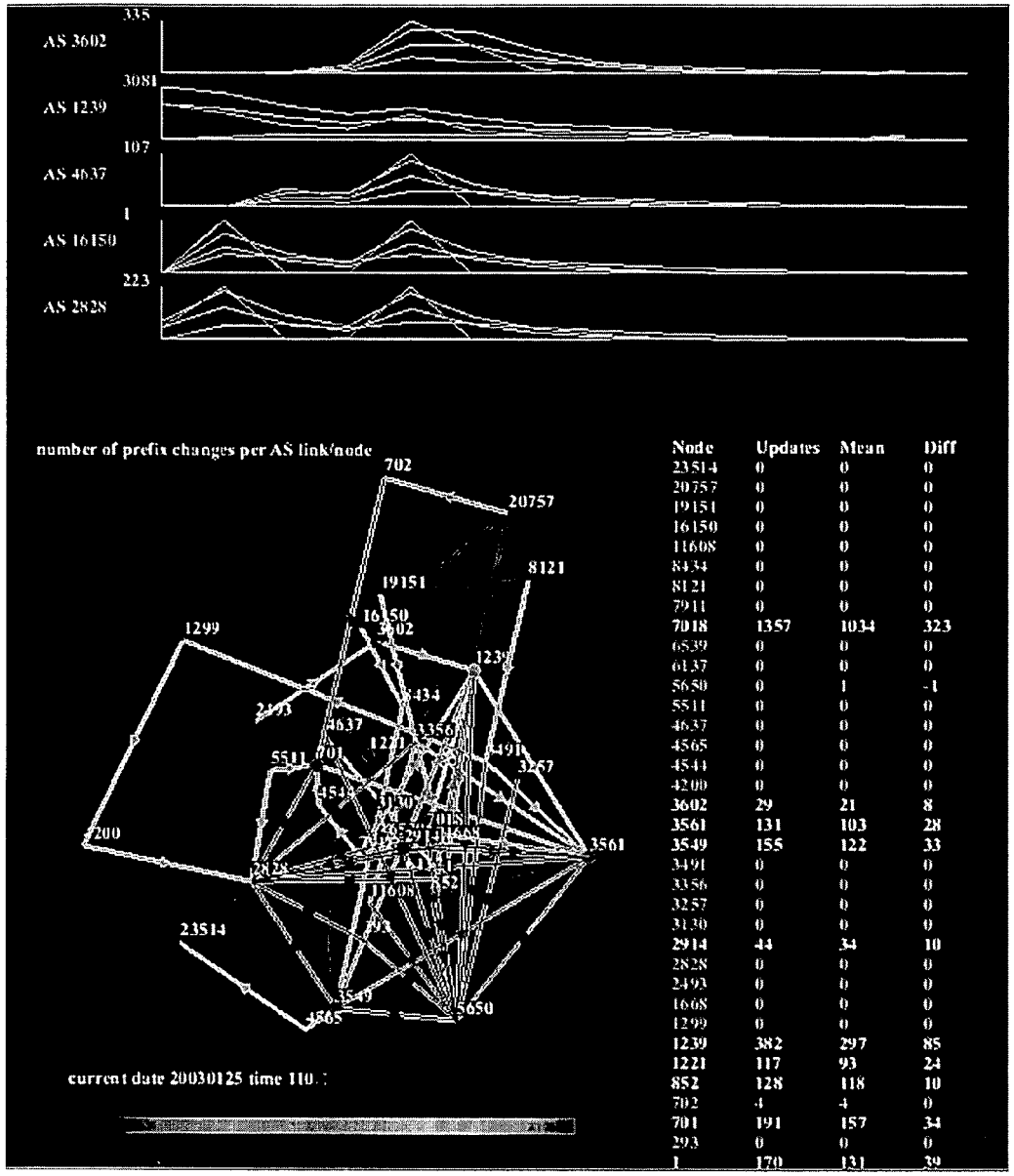
FIG. 3 is a view graph illustrating a first visualization graphic layout of an example embodiment of the present invention.

FIG. 3 is a view graph illustrating a visualization panel layout of an example embodiment of the present invention. The black background is selected for display to enhance the contrast for focusing user attention. What is important is the layout approach in presenting the information illustrated here by the example embodiment of the present invention. Different color schemes, variation of exact layout location and proportion, and alternative layout algorithms can be employed using the novel approach taught by the present invention.

The visualization panel in FIG. 3 is an AS graph. In one embodiment of the present invention, data of selected ASes and prefixes are collected from a vantage point. The collector and analyzer keep track of the number of BGP updates involving the selected prefixes and record the number of BGP updates originating from selected ASes and the number of BGP updates carried over selected AS-AS links. For each AS node shown in the AS graph, the number of BGP updates originating from it is represented by its size. The more update messages originating from the AS, the larger its size. AS graph is also animated over time. The size of an AS represents the moving average of the number of BGP update messages, while the color of the node represents the deviation from the moving average at the current time. If n is the number of BGP updates or BGP events in the current time-step, and a is the current moving average of BGP updates or BGP events, then a is updated as: $a_{new}:=d \times n+(1-d) \times a_{kid}$, where d is the decay factor chosen by the user, $0 \leq d \leq 1$. The deviation at the current time-step is $|n-a_{new}|$. Note that, a larger value of d gives more importance to the present, while a smaller value of d gives more importance to the historical trend. This algorithm is well-known in literature as Exponential Weighted Moving Average (EWMA). In one embodiment of the present invention d is set to equal to 0.2 and an alert is generated if the deviation $|n-a_{new}|$ exceeds a pre-specified threshold set to equal to 0.3. A detailed description of the problem is presented through a separated window that pops up as soon as an alert is generated. The color map is shown at the lower left of FIG. 3, with the minimum value mapped to blue, and the maximum value mapped to red. What is important is the approach illustrated here as example. More sophisticated learning and alerting algorithms can be implemented in other embodiment of the present invention. Different color designations can also be utilized. The example embodiment presented here does not limit the scope of the present invention.

Similarly, for each AS-AS link shown in the AS graph, the number of BGP update messages carried over it is represented by its thickness. The more update messages it carries, the thicker the link becomes. The thickness of each link represents the moving average of the number of BGP update messages, while the color represents the deviation at the current time. In addition, operator has the option to select a few ASes or AS-AS links to show in detail. For each selected AS or AS-AS link, its data is plotted over time. The data plotted in the example of FIG. 3 include (1) the number of BGP updates per time window, and (2) the moving average over time. The system also allows highlighting of selected AS nodes and AS-AS links. There are several ways of selecting and highlighting a node or link: (1) the user can explicitly click on a node or link to toggle whether it's selected and highlighted, or (2) the user can enter the AS number of the AS to select and highlight (AS number is assigned by the network community of various administrative systems) or (3) the user can set a threshold such that every AS node or AS-AS link that has more BGP updates than the threshold is automatically highlighted, or (4) the user can set a number n such that the top n ASes or AS-AS links is highlighted. The AS nodes or AS-AS links can be ordered according to various parameters including but not limited to the number of BGP updates (top n ASes with the largest number of BGP updates are selected in this case), the number of BGP updates divided by the baseline moving average of the number of BGP updates (top n ASes that are deviating the most from their historical trend are selected in this case), etc. If the ASes or AS-AS links are highlighted, the threshold is also displayed. Each highlighted node or link is shown in bright colors in the foreground, while nodes and links that are not highlighted are shown in dull colors in the background as context. An example is shown in FIG. 3.

In one embodiment of the present invention, the user chooses among three different ways of laying out the network graph in the Internet-AS view:

1) Force-based layout: The AS network shown in FIG. 3 example is laid out using the force-based method. Various force-based methods exist; a recent example is Lin and Yen's work~\cite{Lin05}. In this method, the system starts with an initial placement of the nodes representing ASes and line segments representing AS-AS links. Each link is assigned a rest length, and when it deviates from its rest length, a force is exerted on its end-point. For each iteration, the resultant force is calculated and the end point is moved in the direction of the force. Each point is processed successively. For each point, the directional force and the angular force is calculated. The directional force on a point P is calculated as follows: For each point $P_n$ adjacent to P, set the rest length to L, where L is chosen by the user.

At the current layout, calculate the current length, which is $|P_n-P|$. If the current length is greater than the rest length, a force is exerted on point P in the direction $v=P_n-P$ with the magnitude $|P_n-P|-L$. If the current length is less than the rest length, a force is exerted on point P in the direction of $v=P_n-P$ with the magnitude $L-|P_n-P|$. All the forces from each adjacent point to P are summed. The angular force on a point P is calculated as follows: First, consider a point $P_n$ adjacent to P, all the points adjacent to $P_n$ are sorted in angular order, e.g. in counter-clockwise order. Then the two points $P_l$ and $P_r$ adjacent to $P_n$ on the left and on the right of P are examined. The angle between $P_nP$ and $P_nP_l$ is called the left-side angle l. The angle between $P_nP$ and $P_nP_r$ is called the right-side angle r. If the left-side angle is greater than the right side angle, then $P_n$ exerts a force on P in the direction tangent to $P_nP$ counter-clockwise, with magnitude l-r. Otherwise, $P_n$ exerts a force on P in the direction tangent to $P_nP$ clockwise, with magnitude r-l. All the forces due to each adjacent point to P are summed. The directional force and angular force on each point P are summed to be the total force. Point P is moved in the vector direction of the total force. The force is also damped so that each point moves by only 1% of the screen dimension at each iteration.

Figure 4:
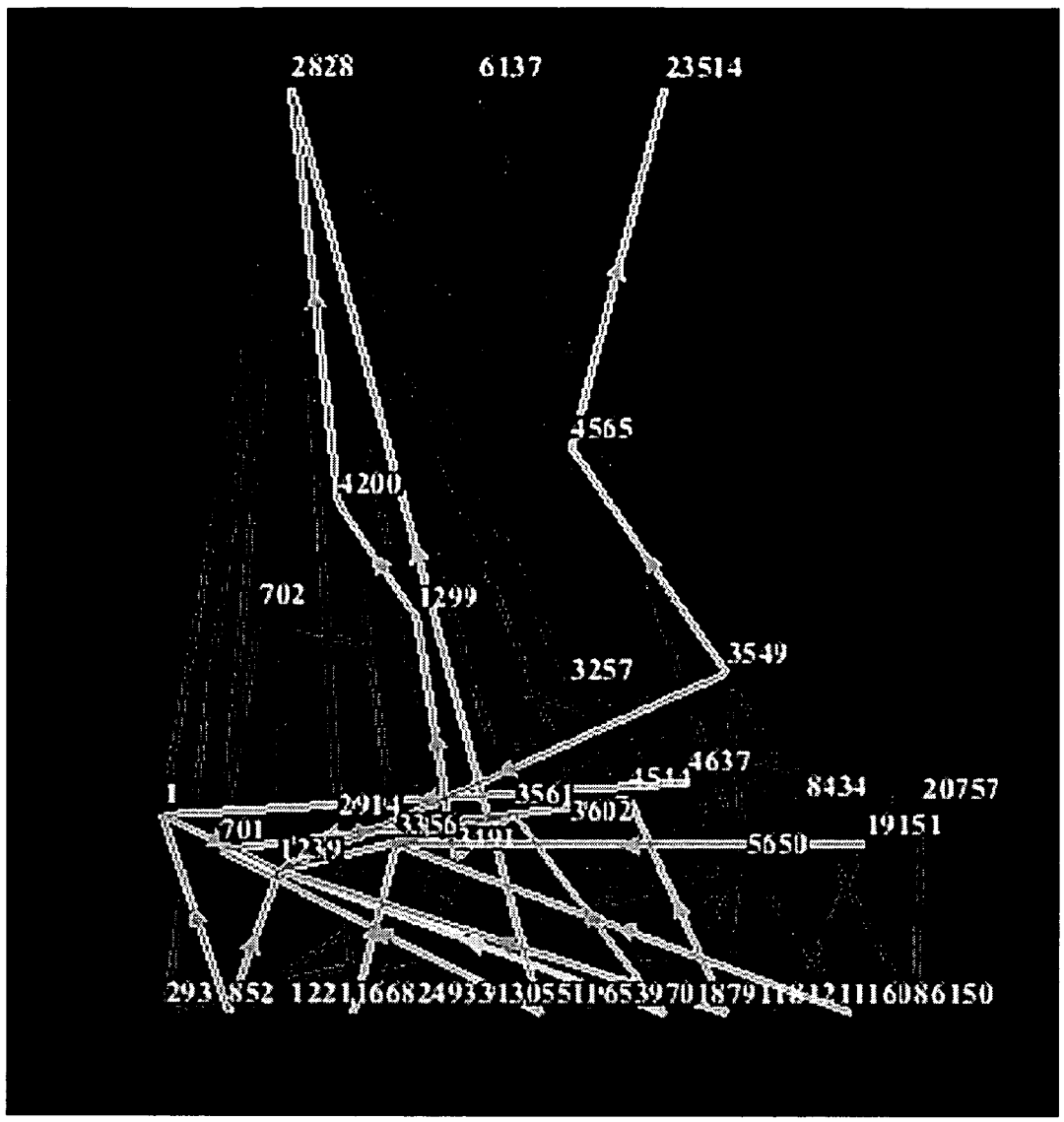
FIG. 4 is a view graph illustrating a second visualization graphic layout of an example embodiment of the present invention.

2) Path distance based layout: The second layout method starts by detecting all the source and sink nodes. The source nodes (with only outgoing edges) are placed at the bottom of the display, and the sink nodes are placed at the top. The system then uses a breadth-first-search algorithm to assign a distance number to each remaining node. The distance number of a node is its distance from the source. All the nodes with the same distance are placed in the same horizontal layer in the display. The method then selects a layer with the most number of nodes and evenly places all the nodes in this layer horizontally. The order is random. For its adjacent layer, the method creates n empty positions, where n is the number of nodes in the layer. For each node in the layer, the method finds the empty position which will minimize the length of the links between the node and its connected nodes in the first layer. The length L of a link between a node N in the new layer and a node M in the first layer is taken to be the difference in their x-coordinate. The node is then placed in this position. This placement method is repeated for all nodes in the layer. In other words, for the next node, all possible empty positions are considered, and the total length for each position are calculated, and the node is placed in the resultant position. Then, this is repeated for all the other layers, going from one layer to its adjacent layer (which has already been placed). FIG. 4 shows an example embodiment of the present invention based using the Path distance based layout. The black background is selected for display to enhance the contrast for focusing user attention. What is important is the layout approach in presenting the information illustrated here by the example embodiment of the present invention. Different color schemes, variation of exact layout location and proportion, and alternative layout algorithms can be employed using the novel approach taught by the present invention.

3) Manual layout: The third layout method allows the user to manually adjust the position of each node by clicking and dragging the node. This method can be used in conjunction with either of the two methods above.

Another view of the BGP dynamics provided by the system of the present invention is the Home-Centric view. By "Home-Centric", it is meant that the BGP updates are observed from a selected "home" observation point, much like how this term is used in Ball et. al's work~\cite{Ball04}. Four different example layouts help the operators to gain knowledge about BGP dynamics.

Figure 5:
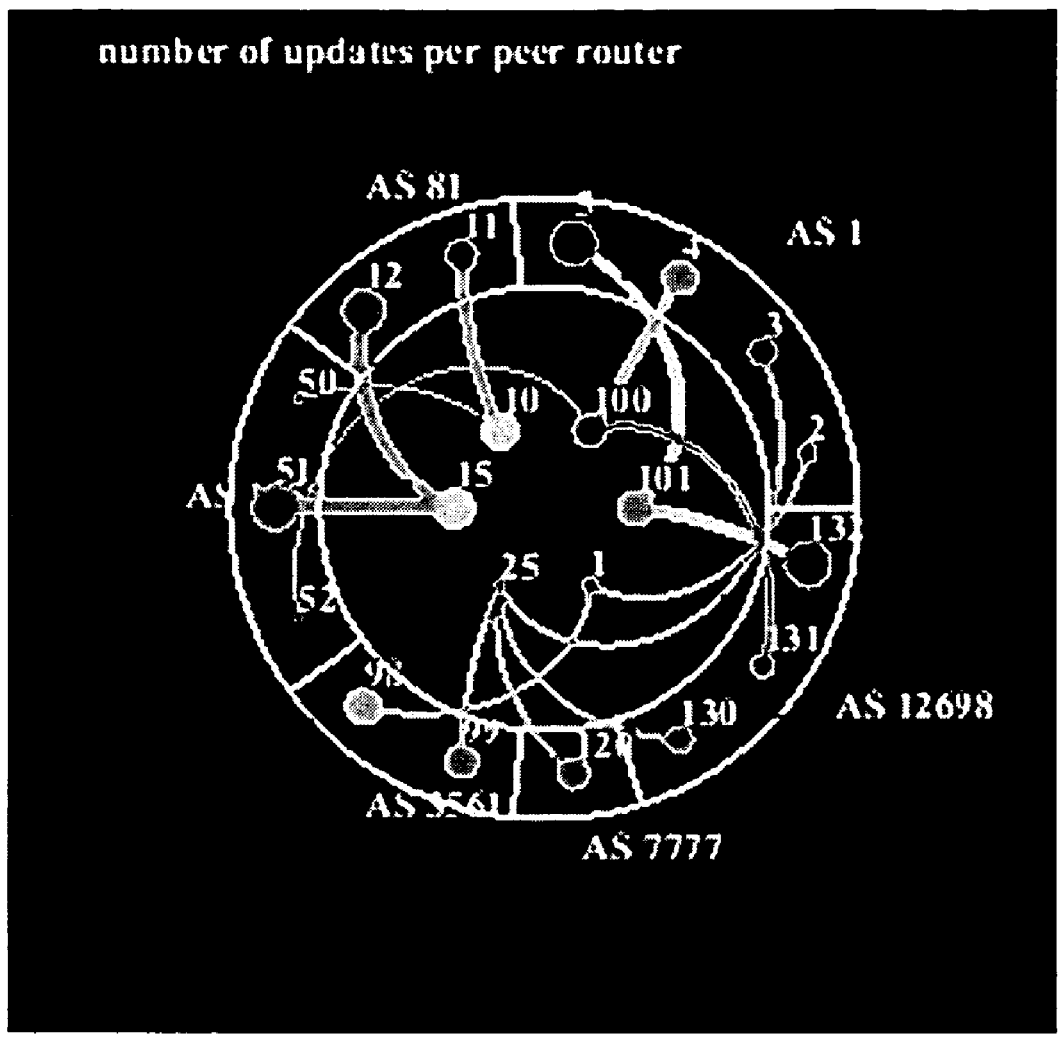
FIG. 5 is a view graph illustrating a third visualization graphic layout of an example embodiment of the present invention.

A graphical layout panel of an example embodiment of the present invention is shown in FIG. 5. The black background is selected for display to enhance the contrast for focusing user attention. What is important is the layout approach in presenting the information illustrated here by the example embodiment of the present invention. Different color schemes, variation of exact layout location and proportion, and alternative layout algorithms can be employed using the novel approach taught by the present invention. This panel gives a high-level view of the AS and it is the first panel that must be consulted to check the health of the AS. In this view, the routers in the observation AS are placed in an inner ring, and their peer routers belonging to other ASes (peer administrative systems, a term well known to those skilled in the art, referring to administrative systems between network operators sharing a peering agreement) are placed in the outer ring. In the outer ring, routers in the same AS are grouped together. The node placement algorithm used in this example reduces the distance between connected nodes. The node placement method works as follows. First, a list of the outer ASes that are connected to each inner node is made. A weight is assigned for each pair of inner node. The weight indicates the closeness between two inner nodes. In one embodiment of the present invention, the weight w of inner nodes A and B is set to be the number of common adjacent ASes that Node A and Node B have.

Then, three inner nodes are selected as seed and placed in a circular linked list. For each additional inner node, it is added to the circular linked list at the position that would lead to the minimum total weighted distance. The weighted distance D between two inner nodes A and B is their weight times the distance d between them in the circular linked list. In other words, $D=w \times d$. The distance d between two nodes is the path distance between them in the circular linked list. In this way, all the outer nodes are arranged in a ring according the order they are placed in the circular linked list. When the relative positions of all the ASes is fixed on the outer ring, A minimum and maximum angles are assigned for each AS. These angles are determined as follows. The angle per router $a_r$ is defined to be 360/n, where n is the total number of routers. Starting with an AS $A_0$ on the outer ring. The minimum angle min-Ang of $A_0$ is set to be 0. Next, the maximum angle max-Ang of $A_0$ is set to be the min-Ang+k×$a_r$. The minimum angle of the next router $A_1$ is simply set to the maximum angle of $A_0$. In this way, the minimum and maximum angles of all ASes are set. The average angle of each AS is defined to be average of its minimum and maximum angles. Next, n empty positions is located in the inner ring, where n is the number of internal routers. Starting with the first internal router, it is placed in the empty position that minimizes its distance to the external ASes that it is connected to. The distance d between an external AS and an internal router is equal to their angular difference. The total distance D from an internal router to all external ASes is the sum of all distances from the external AS to internal routers to which it is connected. In this way, for each internal router, the position is determined in the inner ring where the distance is minimized. If this position is filled by a previous internal router, then the router is placed at the nearest empty position. Finally, within each peer AS, the routers are placed one after the other in a way that the total distance to adjacent inner routers is minimized at each step. This is done in exactly the same way as placing the internal routers. Starting with k empty positions for an external AS that contains k routers, each router is placed at the position that minimizes the angular distance to all its connected internal routers. If that position is not empty, it in is placed at the nearest empty position.

After the nodes are placed, lines are drawn between the inner routers and outer routers which are connected. The thickness and color of the links are assigned according to the number of BGP updates traveling through them as described previously. The links are drawn as curved lines to avoid cutting across the inner circle. If the radius of the inner ring is $r_1$ and the radius of the outer ring is $r_2$, the angle of an internal node is $\theta$, and the angle of an external node is $\phi$, then, the curved line between the two nodes is represented by the parametric equation:

$$((p \times r_1 + (1-p) \times r_2) \times \cos(p \times \theta + (1-p) \times \phi), ((p \times r_1 + (1-p) \times r_2) \times \sin(p \times \theta + (1-p) \times \phi), 0 \leq p \leq 1.$$

Figure 6:
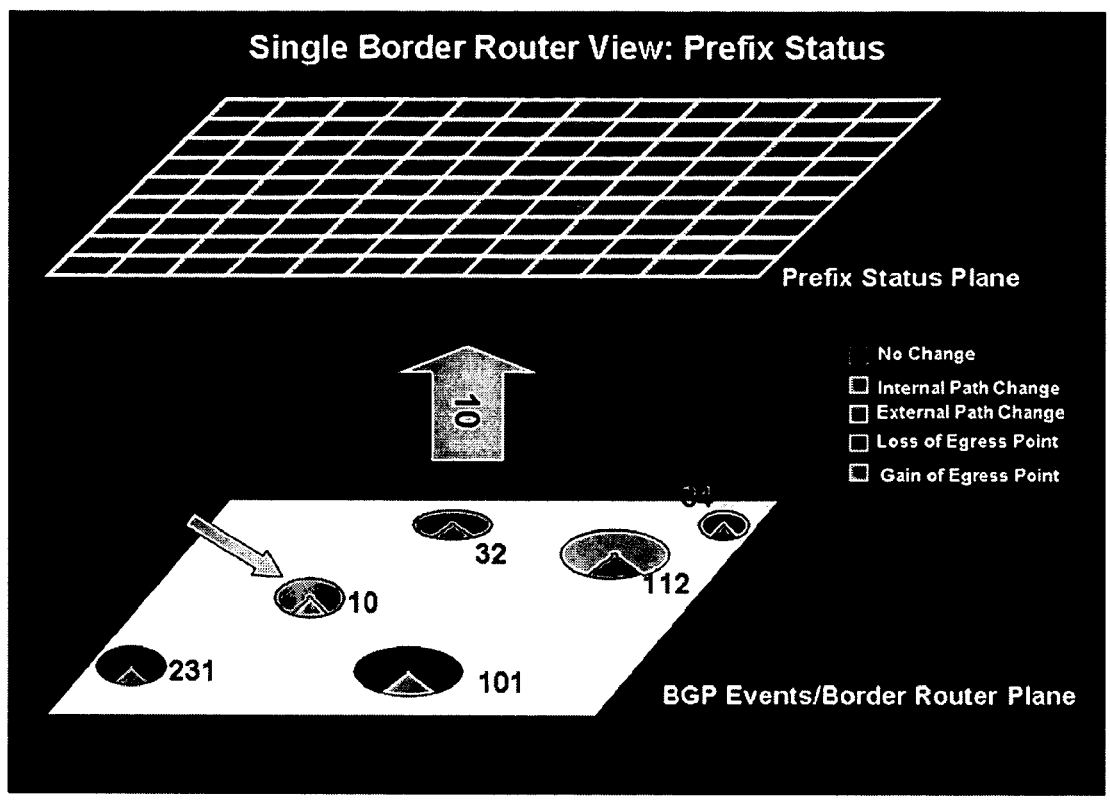
FIG. 6 is a view graph illustrating a fourth visualization graphic layout of an example embodiment of the present invention.

Although the panel shown in FIG. 5 monitors the number of BGP updates or BGP events processed by each border router over time to highlight shifts from normal trends, it does not provide a deeper understanding of what kind of BGP events is progressing. For this purpose, a new panel is shown in FIG. 6. The black background is selected for display to enhance the contrast for focusing user attention. What is important is the layout approach in presenting the information illustrated here by the example embodiment of the present invention. Different color schemes, variation of exact layout location and proportion, and alternative layout algorithms can be employed using the novel approach taught by the present invention. The panel shows the prefix status from a single border router perspective. Goal of this layout is to show 1) total number of BGP events generated by any border router, 2) the repartition of BGP events in classification types and 3) the routing status for any destination prefix. In one embodiment of the present invention, the layout is composed by two planes, called respectively "Border Router Plane" (on the bottom) and "Prefix Status Plane" (on the top). Border routers are placed into the "Border Router Plane" according to their geographical location. The destination prefixes are placed onto the "Prefix Status Plane" placed according to the AS they belong to. Each border router and prefix is uniquely identified by their own id. For each border router this panel displays 1) the total number of BGP events processed represented by the size of the associated pie-chart and 2) the number of BGP events for each of the five classification types described earlier. Each classification type is displayed using a different color. The size of each sector displayed in a different color in the pie-chart reflects the number of BGP events observed for each of the five classification types. The operator interested in learning how a specific border router reaches a specific destination prefix, can click on the router of interest and consult the plane on the top. On this plane the status of all destination prefixes for the selected router is displayed. In one embodiment of the present invention, a destination prefix appears red if no routing change has been experienced by the router and the router is able to reach the prefix by using the same route learned previously, and a prefix that appears orange implies that a routing change has been generated by the router and a new route has been learned via an iBGP session.

Two algorithms to place border routers and destination prefixes onto the two planes are described as follows. To place border routers onto the "Border Router Plane", the plane is divided into a regular grid such that the size of each grid square is equal to the maximum node size corresponding to the border router with the largest number of BGP events. It is assume that the total number of grid squares is greater or equal to the total number of nodes to be placed. Next, each node is positioned according to its coordinates x and y. The user can decide between two options: 1) place the routers according to their geographical location, i.e. x represents its latitude while y its longitude; 2) place the routers according to the ASes they have established a BGP session with. These two placement options help the operator to localize a possible problem either physically (geographical placement) or logically (AS placement). The placement of destination prefixes is slightly more complicated due to its larger cardinality. The following algorithm is used to efficiently display the prefix space. Each prefix is univocally identified by concatenating its IP address into address part A, and concatenating its network-mask into a network-mask part M. The two parts can be concatenated into an integer number N that univocally identifies each prefix. Prefixes can be ordered either by network-mask or address. In an example embodiment of the present invention the prefixes are ordered by mask-major order. In mask-major order, each prefix identified by the pair (A,M) is represented by the integer number N computed as $N = M \times 2^{32} + A$. These prefixes are sorted from smallest to the largest according to N. Each prefix now is assigned a sorted order number P, where P=0 is the first prefix and P=k−1 is the last prefix (where k is the number of distinct IP prefixes). Then an n×n matrix is built where n=ceiling(square root(k)) and k is the number of distinct IP prefixes. "Ceiling" is a well known function that rounds up to a next larger integer. This matrix is then mapped onto the "Prefix Status Plane". Then, each prefix is placed in the i-th column and j-th row, where I=P/n and j=P modul n. This way, each prefix is placed into a specific position on the plane by using i, as the y coordinate of the plane and j as the x coordinate of the plane. The visualization provided by this mapping shows patterns of the distribution of prefixes affected by the routing updates, and provides useful insights.

Figure 7:
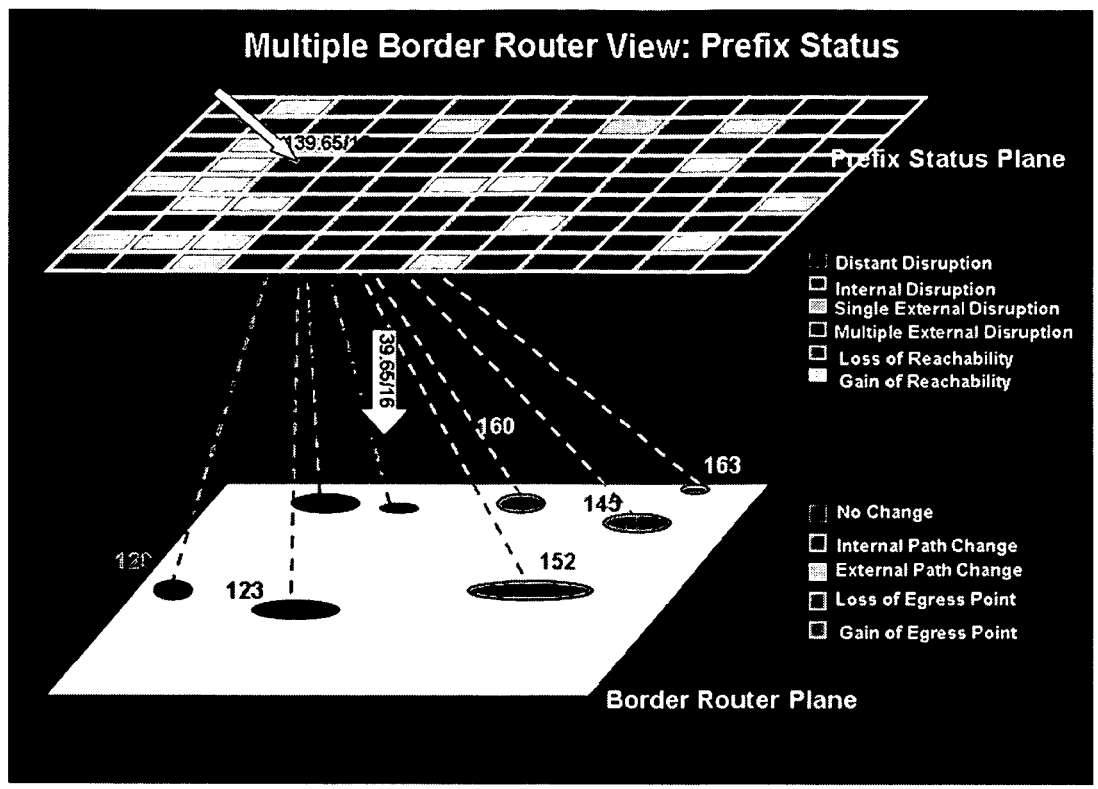
FIG. 7 is a view graph illustrating a fifth visualization graphic layout of an example embodiment of the present invention.

An operator that is interested in learning how each border router reaches a specific prefix over time may want to consult the panel presented in FIG. 7. The black background is selected for display to enhance the contrast for focusing user attention. What is important is the layout approach in presenting the information illustrated here by the example embodiment of the present invention. Different color schemes, variation of exact layout location and proportion, and alternative layout algorithms can be employed using the novel approach taught by the present invention. This panel shows the prefix status from a multiple border router perspective. Goal of this layout is to show 1) the status of all prefixes from a multiple border router perspective and 2) which border router was involved in a routing change, if any. In one embodiment of the present invention, the layout is composed by two planes: "Prefix Status Plane" (on the top) and "Border Router Plane" (on the bottom). The placement of both routers and prefixes is done using the same layout algorithms described for FIG. 6. The Prefix status Plane shows the status of all prefixes when the routing information from all border routers is collected and analyzed together. Prefixes mapped to the same color are likely to be associated to the same network problem. By clicking on a specific destination prefix, information of the routing status of all border routers is displayed on the bottom plane. The size of the pie-chart associated to each border router is an indicator of how many BGP events of that classification type the router has processed.

Figure 8:
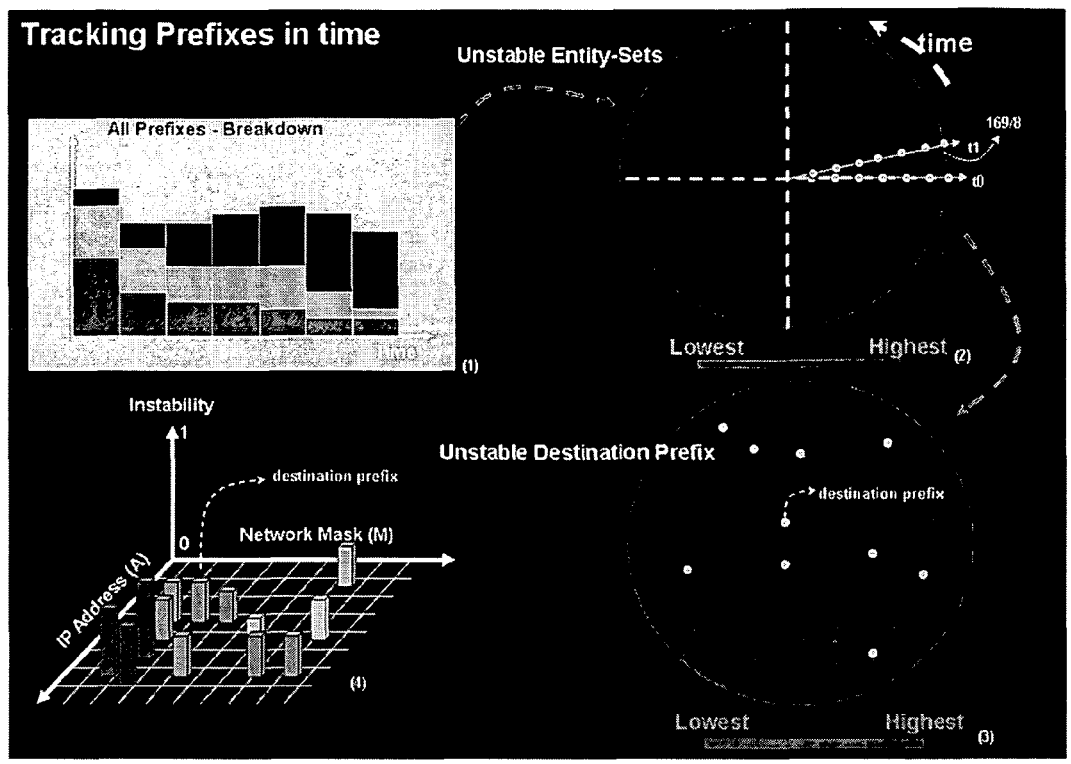
FIG. 8 is a view graph illustrating a sixth visualization graphic layout of an example embodiment of the present invention.

The panel presented in FIG. 8 shows the status of prefixes over time, highlighting the ones that exhibit the most unstable behavior, i.e. large number of BGP updates or BGP events over time. The black background is selected for display to enhance the contrast for focusing user attention. What is important is the layout approach in presenting the information illustrated here by the example embodiment of the present invention. Different color schemes, variation of exact layout location and proportion, and alternative layout algorithms can be employed using the novel approach taught by the present invention. In one embodiment of the present invention, the layout is composed by four plots. The plot on the top left is a histogram that shows the number of prefixes belonging to different network states over time. Three prefix states are defined: 1) green indicates a stable set of prefixes, 2) red indicates an highly unstable set of prefixes that an operator must constantly monitor, while 3) yellow represents a transitory state that falls in between. The mapping of prefixes into states is done accordingly to default thresholds selected manually by the user. The user has the option to use fixed threshold or relative threshold. The relative threshold corresponds to current prefix activity divided by its historical baseline which is learned dynamically using algorithm such as Exponential Weighted Moving Average described earlier. A operator interested in monitoring a specific prefix state over time, can then click on a colored portion of the histogram representing the specific prefix state and consult the second plot at the top-right. The layout is represented by a (0,1) circle, that is colored according to the prefix state selected.

The example graphic layout shown in FIG. 8 reflects the case that the user has selected the unstable prefix state, i.e. red state. The time dimension is captured by the angular coordinate $\theta$, while the instability of a prefix is captured by the radial coordinate r. The color variation of the circle ranges from bright red in the center to dark red toward the edge. The color-bar underneath the circle indicates the dark red representing highest un-stability and bright red representing lowest un-stability. For example, if the operator wants to track the last 6 hours worth of data, then each incremental degree of the circle represents 1 minute worth of data (360 minutes divided by 360 degrees or $\delta\theta=1$ degree/minute). In order to have a readable and comprehensible visualization of the unstable prefixes, the prefixes are grouped into blocks of IP address. In the context of this document, each block of IP address is called Entity set. For example, a network operator owns an AS may include several large customers each assigned their block of IP address, or Entity set. Block of IP address is well known to a person skill in the art and typically represented in a format e.g. 169/8. The stability of each Entity set can be represented by different means. In one example embodiment of the present invention it is representing the amount of BGP updates associated with the Entity set over a time period. In another example embodiment of the present invention it is representing the amount of BGP updates per unit time associated with the Entity set over a time period. The number of prefixes, or Entity set to be displayed in the second plot is represented as $N_{SET}$. $N_{SET}$ is pre-configured and can be changed by the user at any time. For example, if the user is interested in the top 10 ($N_{SET}=10$) unstable Entity sets, then the radius r is divided in 11 ($N_{SET}+1$) intervals and each set is placed along the radial coordinate in each interval, with the most unstable set placed at r=1 and the least unstable placed at r=2/($N_{SET}+1$). The repartition into $N_{SET}+1$ is done to avoid the overlapping of the least unstable sets at different times into the center r=0.

A user interested in understanding the distribution of IP addresses inside a specific Entity set can select it by clicking on the corresponding node in the second plot on the top right to zoom in using the third plot on the bottom-right or the fourth plot on the bottom left. The third plot is a 2D-circular layout and displays all destination prefixes belonging to the selected Entity-Set. In the third plot the most stable prefixes is located close to the center r=0 and the most unstable ones close to the edge r=1. The placement of the prefixes in the circle is done according to the following algorithm. Assuming a specific set Entity-Set S composed of $N_S$ prefixes is to be visualized. First, each prefix is classified according to the IP Address and Network Mask. The prefixes are ordered according to their Network Mask, as described for FIG. 5. Assuming that the largest number of BGP Events observed in this Entity set is $Max_S$. Each prefix p in the Entity set S is placed in the (0,1) circle according to the polar coordinate $(\theta_p, r_p)$. The angular coordinate $\theta_p$ univocally identifies the prefix p in the Entity set S, while the radial coordinate $r_p$ represents the number of BGP Events associated with the prefix p. Thus, each prefix p is placed in the (0,1) circle with polar coordinates $\theta_p=\theta_{p-1}+\delta\theta$ and $r_p=n_p/Max_S$, where $\theta_{p-1}$ represents the angular coordinate of the previous prefix placed (starting from $\theta_0=0$), $\delta\theta=360/N_S$ and $n_p$ represents the number of BGP Events associated with the prefix p. The user can choose $Max_S$ to be the maximum number of BGP Events observed across several Entity sets in case he wants to have a normalized view of multiple sets at the same time.

The fourth plot is a planar 3D plot, where each destination prefix is identified by its IP address A and Network Mask M. Each prefix is placed according to (A,M) into a plane, where the x-axis represents the concatenated IP address (A), while the y-axis represents the concatenated Network Mask (M). The instability of the prefix is then represented by a bar with length between 0 and 1, where 0 represents a very stable prefix (green color) and 1 represents a very unstable prefix (red color). All prefixes falling between these two extreme cases are then mapped using colors from green to red. The user can choose between the third plot and the fourth plot according to the size of the Entity set he is interested in analyzing for better clarity. What is important is the approach illustrated here as example. Different placement algorithms can be used in other embodiments of the present invention. Different color designations can also be utilized. The example embodiment presented here does not limit the scope of the present invention.

The Trouble-shooter module is in charge of trouble-shooting the detected problem to infer a most likely cause. Two families of problems can be easily extracted by using the concept of BGP events: "Persistent Flapping Prefixes" and "Frequent Flapping Prefixes".

In the context of the present invention "Persistent Flapping Prefix" is defined as the following. BGP event is defined as a sequence of BGP updates for a destination prefix that occur close together in time and last within convergence-timeout period. In one embodiment of the present invention the inter-arrival time is set to be less than 70 seconds and the convergence-timeout period is set to be 600 seconds. Certain destination prefixes never converge to a stable path due to persistent routing instabilities. Persistent flapping disrupts the reachability of the destination and imposes a significant BGP processing load on the routers, making it important for operators to detect and fix these problems. In an example embodiment of the present invention, a destination prefix is categorized as persistent flapping if a number of BGP updates received with inter-arrival time less than 70 seconds and lasts longer than the convergence-timeout 600 seconds. The threshold of 70 seconds and 600 seconds are example for illustrating the invention. Other values for these thresholds may be selected based on network environment. A person with ordinary skill in the art will recognize that this information is easily computable in real-time and can be reported by the Visualizer in real-time. A person with ordinary skill in the art will recognize that deeper analysis can be carried out to further breakdown Persistent Flapping Prefix into three major categories: Unstable Interface/Session (flaky edge link or eBGP sessions), MED Oscillation (BGP does not impose an ordering on the routes in the system if routes have the same next-hop AS) and Conservative Flap-Damping Parameters (repeated advertisements and withdrawals by a neighboring AS). A person with ordinary skill in the art will recognize that Unstable Interface/Session can be studied using syslog files, the MED Oscillation can be studied by inspecting the BGP Update message in detail, and the Conservative Flap-Damping Parameters can be studied by inspecting router configurations.

In the context of the present invention "Frequent Flapping Prefix" is defined as the following. A prefix is said to frequently flap if a large number of BGP updates spans a large time frame. These problems are usually associated with flaky equipments that fail every few minutes, falling outside the 70 second criteria for grouping BGP updates into BGP events. We group BGP events for the same destination prefix that occur close together in time (a BGP events is composed of BGP updates with inter-arrival time less than a threshold $thresh_F$, e.g. 70 seconds), and flag cases where the number of BGP events exceeds a predefined threshold max_count during a period of time $thresh_T$. Based on previous results, an embodiment of the present invention chooses $thresh_T=900$ seconds and max_count=10. This means more than 10 BGP events occurred within a period of 900 seconds. A person with ordinary skill in the art will recognize that this information can be displayed by the Visualizer in real-time due to the simple operations required to extract this information.

An embodiment of the present invention classifies and reports two important families of problems: Hot-Potato routing and eBGP Session Reset. In an embodiment of the present invention the Trouble-shooter aggregates BGP events into BGP clusters and classifies the root-cause as follows.

Hot-Potato Routing: According to the BGP decision process in FIG. 1, a router selects the route with the smallest IGP cost among multiple equally good BGP routes (i.e. routes that have the same local preference, AS path length, origin type, MED value and eBGP vs. iBGP learned). Such routing practice is known to a person skilled in the art as hot-potato routing. An IGP topology change can trigger routers in a network to select different BGP route for the same prefix, and these changes may affect multiple prefixes. Hot-Potato routing changes only the egress points each router selects for the prefixes. According to the event classification this falls in the category of internal disruptions. When these kinds of disruption occur, the operators need to know which routers and prefixes are affected to gauge the significance of the event. To identify this problem, BGP events are aggregated into BGP cluster defined as a set of BGP events associated with different prefixes that 1) belong to the same category of the event classification, 2) undergo the same kind of transition (from better to worse, or worse to better) and 3) start no more than $thresh_P$ seconds after the first event. The present invention takes the start time of the events into consideration because the first update is most likely to be directly triggered by the network event. An embodiment of the present invention implements this heuristic by keeping track of the identifying information for each cluster (i.e., the event category and the type of transition) as well as the time of the first event and a count of the number of events. Each new event is checked for matches with the identifying information of each cluster and arrival time to be within $thresh_P$ seconds after the first event in the cluster. An embodiment of the present invention uses $thresh_P=60$ seconds. Since $thresh_P$ is used to compare start times of two events, the heuristic does not assume that a cluster is complete once the current time (the time of newly arrived BGP update in the system) is $thresh_P$ after the time of the first event in the cluster since an event may still be in progress. Given that an event last for at most as long as convergence-timeout (set to equal to 600 seconds in an example embodiment of the present invention), each BGP cluster is declared complete after $thresh_P$+convergence-timeout=660 seconds in this example embodiment of the present invention.

After generating the BGP cluster, the present invention compares the old and new r-vectors for all of the BGP events in the BGP cluster, because each element in the r-vector carries the next-hop address for the corresponding router.

eBGP Session Reset: The failure and recovery of an eBGP session can cause multiple events that affect the eBGP-learned routes from one neighbor of a single border router. Upon losing eBGP connectivity to a neighbor, the border router must stop using the routes previously learned from that neighbor and switch to less-attractive routes. The border router may switch to an eBGP-learned route from a different neighbor. If such a route exists; this would result in an "external path change" for the destination prefix. Alternatively, the router may have to switch to an iBGP-learned route from a different border router; this would result in a "loss of egress point" for the destination prefix. When the session recovers, the border router learns the BGP routes from the neighbor and switches back to the eBGP-learned routes advertised by this neighbor for one or more destination prefixes causing either an "external path change" or a "gain of egress point". An example embodiment of the present invention identifies a session failure by first grouping BGP events into BGP clusters which are defined as a set of BGP events associated to different prefixes that 1) belong to the category "single external disruption", 2) have an old route with the same border router and neighbor (i.e., the same $R_p^{j,old}$), 3) have a routing change that goes from better to worse, and 4) occur closely together in time. However, this is not enough to ensure that the session failed, unless the router has stopped using most (if not all) of the routes previously learned from that neighbor. As such, an example embodiment of the present invention checks that the number of prefixes using the neighbor has decreased dramatically. Similarly, an example embodiment of the present invention identifies session recovery by first grouping BGP events into BGP clusters defined as a set of BGP events associated with different prefixes that 1) belong to the category "single external disruption", 2) have a new route with the same border router and neighbor (i.e., the same $R_p^{j,old}$), 3) have a routing change that goes from worse to better, 4) occur close together in time, and 5) involve a significant increase in the number of prefixes associated with that neighbor, back to a baseline level. What is important is the approach illustrated here as example. Additional methods of grouping BGP events into BGP clusters can be implemented in other embodiment of the present invention. The example embodiment presented here does not limit the scope of the present invention.

The system in the present invention keeps historical routing and traffic data over a time period that can be specified by user. The Analyzer can be configured to track vital statistics of the network, e.g., some combination of topology, traffic attracted by certain prefixes, BGP events associated with those prefixes, and the amount of updates through the associated AS paths. Each combination of these statistics represents an "instant network snapshot" of the global Internet as perceived by an AS domain, where the system is deployed. With this capability, a network operator could track the network change and evolution by comparing the network snapshots at different instances. In other words, the system allows an operator to "playback" and "animate" what has happened in their network to help them in the trouble-shooting process. For example, one can observe the built-up of a BGP storms by examining a cross-section of the Internet, i.e., a group of ASes, traversed by large volumes of BGP updates. If the Collector is set up to gather BGP data at different vantage points across the Internet, the Visualizer can also animate the spatial propagation of BGP updates, e.g., BGP beacons. Lastly, the ability of the tool to capture and replay network evolutions is important because it enables accurate reproduction of network behavior for off-line simulation or emulation studies. Such off-line experiments are particularly useful in analyzing the effect of a particular change in BGP configuration change on general BGP stability and traffic distributions.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A system for managing a network comprising:
a plurality of administrative systems, wherein each of the plurality of administrative systems comprises one or more prefix and one or more border router; and
a display configured to display in real-time one or more graphical layout representing one or more network information, wherein the one or more graphical layout comprises:
one or more first node representing one or more border router of a selected administrative system, wherein the one or more first node is placed in a first charting object, wherein a first attribute of the one or more first node represents a first activity originating from a corresponding border router of the selected administrative system;
a plurality of second nodes representing border routers of a plurality of peer administrative systems of the selected administrative system, wherein the plurality of second nodes are placed in a plurality of portions of a second charting object, wherein a portion of the plurality of second nodes corresponding to a same peer administrative system among the plurality of peer administrative systems is grouped within a displayed boundary of a portion among the plurality of portions, wherein a second attribute of the plurality of second nodes represents a second activity originating from a corresponding border router of the plurality of peer administrative systems; and
one or more router link each connecting a pair of a first node of the one or more first node and a second node of the portion of the plurality of second nodes and intersecting the displayed boundary of the portion among the plurality of portions, wherein a third attribute of the one or more router link represents a third activity associated with the pair of the first and second nodes,
wherein placement of the one or more first nodes and the one or more second nodes in the first charting object and the second charting object, respectively, is determined based on minimizing a distance measure of connected nodes in the one or more first nodes and the one or more second nodes, wherein the connected nodes are connected by the one or more router link,
wherein the one or more first node is placed in the first charting object based on minimizing a first weight determined based at least on placement of the one or more first node in the first charting object, and
wherein the plurality of second nodes are placed in the plurality of portions based on minimizing a second weight determined based at least on placement of the plurality of the second nodes in the second charting object.

2. The system of claim 1 wherein the one or more network information comprises a plurality of BGP events categorized into a plurality of BGP Event Classifications comprising No Change, Internal/External Path Change, Loss/Gain of Egress Point, Distant/Transient Disruption, Internal Disruption, External Disruption, Multiple External Disruptions, Loss/Gain of Reachability.

3. The system of claim 2 wherein the display is further configured to animate the one or more graphical layout representing the network information in real-time for identifying a network problem.

4. The system of claim 3 wherein animating the one or more graphical layout comprises playing back the one or more network information to identify a cause of the network problem.

5. The system of claim 2 wherein the display is further configured to perform at least one selected from a group consisting of a temporal correlation and a spatial correlation to identify a network problem.

6. The system of claim 5 wherein performing the at least one selected from a group consisting of the temporal correlation and the spatial correlation comprises generating one or more BGP cluster according to the plurality of BGP events.

7. The system of claim 1 wherein the one or more graphical layout comprises a force-based layout.

8. The system of claim 1 wherein the one or more graphical layout comprises a path distance based layout.

9. The system of claim 1 wherein at least one selected from a group consisting of the first attribute, the second attribute and the third attribute comprises a size, wherein at least one selected from a group consisting of the first activity, the second activity and the third activity comprises one of a moving average of a number of BGP updates and a deviation from the moving average.

10. The system of claim 1 wherein one or more detail of at least one administrative system (AS) of the selected AS and the plurality of peer ASes is selectively displayed in the one or more graphical layout responsive to a step selected from a list consisting of:
 a user clicking on a node representing the at least one AS,
 a user entering a number representing the node,
 a user entering a threshold for comparing to a number of BGP updates of the at least one AS, and
 a user entering a number n for comparing to an order of the at least one AS.

11. The system of claim 10 wherein the order of the at least one AS is ordered according to the number of BGP updates.

12. The system of claim 10 the order of the at least one AS is ordered according to the number of BGP updates divided by a baseline of the number of BGP updates.

13. The system of claim 1 wherein the first charting object comprises a inner circle, the second charting object comprises an outer ring, and the plurality of portions of the second charting object comprises one or more sector of the outer ring.

14. The system of claim 13:
 wherein the one or more sector is placed in the outer ring according to a total weighted distance that is minimized,
 wherein the total weighted distance equals a sum of one or more weighted distance corresponding to one or more pair of sectors,
 wherein the weighted distance equals a weight of the corresponding pair multiplied by a distance of the corresponding pair,
 wherein the weight equals a number of border routers of the selected administrative system connected to both peer administrative systems of the corresponding pair,
 wherein the distance equals to a path distance between both sectors of the corresponding pair,
 wherein the path distance of the corresponding pair is determined according to a position of both sectors of the corresponding pair in a circular linked list,
 wherein the circular linked list is formed with a seed of three selected sectors,
 wherein one or more additional sector is added to the circular linked list according to the total weighted distance that is minimized,
 wherein the one or more sector is placed in the outer ring according to a position of the one or more sector in the circular linked list,
 wherein the one or more first node is placed in the inner circle according to a first total distance that is minimized,
 wherein the first total distance equals a sum of one or more angular difference of one or more first pair, each first pair comprising a first node and a sector wherein the corresponding border router is connected with the corresponding peer administrative system,
 wherein the plurality of second nodes are placed in the one or more sector according to a second total distance that is minimized, and
 wherein the second total distance equals a sum of one or more angular difference between a second node and one or more of the first node wherein the border router corresponding to the second node is connected with the one or more border router corresponding to the one or more first node.

15. The system of claim 13 wherein each link is laid-out as a curve according to a parametric equation:

$$((p \times r_1 + (1-p) \times r_2) \times \cos(p \times \theta + (1-p) \times \phi), ((p \times r_1 + (1-p) \times r_2) \times \sin(p \times \theta + (1-p) \times \phi), 0 \leq p \leq 1;$$

wherein $r_1$ represents a radius of the inner ring;
 wherein $r_2$ represents a radius of the outer ring;
 wherein $\theta$ represents an angle of a first node corresponding to the router link;
 wherein $\phi$ represents an angle of an second node corresponding to the router link; and
 wherein p is a parameter traversing from 0 to 1 for forming the parametric equation.

16. A method for managing a network, wherein the network comprises a plurality of administrative systems, wherein each of the plurality of administrative systems comprises one or more prefix and one or more border router, the method comprising:
 obtaining one or more network information associated with the plurality of administrative systems;
 generating, using a processor of a computer, one or more graphical layout representing the one or more network information, wherein generating the one or more graphical layout comprises:
 representing a selected border router of a selected administrative system using a border router node enclosed within a displayed boundary of a first charting object, wherein a first attribute of the border router node represents a count of BGP events originating from the selected border router;
 representing one of a plurality of types of the BGP events using a portion of a plurality of portions of the border router node, wherein each portion of the plurality of portions is enclosed in a respective displayed boundary, wherein a second attribute of each of the plurality of portions represents a count of a portion of the BGP events associated with a respective type of the BGP events; and
 representing one or more destination prefix of the BGP events originating from the selected border router using one or more prefix node enclosed within a displayed boundary of a second charting object, wherein an attribute of a prefix node of the one or more prefix node represents a type of a BGP event associated with a destination prefix represented by the prefix node,
 wherein the one or more prefix node is placed with a x-coordinate equaling x and a coordinate equaling y in the third charting object according to an equation x=P/n, y=P modul n; wherein P represents an order determined according to an IP address and a network mask of the one or more corresponding prefix, n represents a square root of the number of distinct prefix.

17. The method of claim 16 wherein the border router node is placed in the first charting object according to a geographical location of the selected border router.

18. The method of claim 17 wherein a x-coordinate of the border router node is determined from a latitude of the selected border router; wherein a y-coordinate of the border router node is determined from a longitude of the selected border router.

19. The system of method 16 wherein the border router node is placed in the first charting object according to a logical location of the selected border router.

20. The method of claim 16,
 wherein the first charting object comprises a Border Router Plane, the border router node comprises a pie chart, the plurality of portions comprises sectors of the pie chart, and the second charting object comprises a Prefix Status Plane, wherein the first attribute of the border router node comprises a size of the pie chart representing the count of the BGP events, the second attribute of each of the plurality of portions comprises a size of the respective portion representing the count of the respective portion of the BGP events and a color representing the respective type of the BGP events, the attribute of the prefix node comprises a color representing the type of the BGP event associated with the destination prefix represented by the prefix node, and wherein the plurality of types of BGP events comprises at least one selected from a group consisting of:
BGP event with no change,
BGP event with internal path change,
BGP event with external path change,
BGP event with loss/gain of egress point,
BGP event with distant/transient disruption,
BGP event internal disruption,
BGP event with single external disruption,
BGP event with multiple external disruptions, and
BGP event with loss/gain of reachability.

21. The method of claim 20,
wherein the pie chart is highlighted when the selected border router is selected in response to a user clicking on the pie chart, and
wherein the Prefix Status Plane is caused to be modified in response to the selected border router being selected.

22. The method of claim 16 wherein the first charting object is caused to be modified in response to a selected prefix node being selected wherein the modification comprises one or more information corresponding to one or more border routers associated with the selected prefix node being displayed on the first charting object.

23. A method for monitoring computer network, wherein the network comprises a plurality of administrative systems, wherein each of the plurality of administrative systems comprises one or more prefix and one or more border router, the method comprising:
obtaining one or more network information associated with the plurality of administrative systems; and
generating, using a processor of a computer, one or more graphical layout representing the one or more network information, wherein generating the one or more graphical layout comprises:
representing one or more border router of a selected administrative system using one or more first node;
placing the one or more first node in a first charting object, wherein a first attribute of the one or more first node represents a first activity originating from a corresponding border router of the selected administrative system;
representing border routers of a plurality of peer administrative systems of the selected administrative system using a plurality of second nodes;
placing the plurality of second nodes in a plurality of portions of a second charting object;
grouping a portion of the plurality of second nodes corresponding to a same peer administrative system among the plurality of peer administrative systems within a displayed boundary of a portion among the plurality of portions, wherein a second attribute of the plurality of second nodes represents a second activity originating from a corresponding border router of the plurality of peer administrative systems; and
connecting a pair of a first node of the one or more first node and a second node of the portion of the plurality of second nodes using a displayed router link intersecting the displayed boundary of the portion among the plurality of portions, wherein a third attribute of the router link represents a third activity associated with the pair of the first and second nodes, wherein placement of the one or more first nodes and the one or more second nodes in the first charting object and the second charting object, respectively, is determined based on minimizing a distance measure of connected nodes in the one or more first nodes and the one or more second nodes, wherein the connected nodes are connected by the one or more router link, wherein the one or more first node is placed in the first charting object based on minimizing a first weight determined based at least on placement of the one or more first node in the first charting object, and wherein the plurality of second nodes are placed in the plurality of portions based on minimizing a second weight determined based at least on placement of the plurality of the second nodes in the second charting object.

24. The method of claim 23,
wherein at least one selected from a group consisting of the first attribute, the second attribute and the third attribute comprises a size, wherein at least one selected from a group consisting of the first activity, the second activity and the third activity comprises one of a moving average of a number of BGP updates and a deviation from the moving average,
wherein the first charting object comprises a inner circle, the second charting object comprises an outer ring, and the plurality of portions of the second charting object comprises one or more sector of the outer ring,
wherein the one or more sector is placed in the outer ring according to a total weighted distance that is minimized,
wherein the total weighted distance equals a sum of one or more weighted distance corresponding to one or more pair of sectors,
wherein the weighted distance equals a weight of the corresponding pair multiplied by a distance of the corresponding pair,
wherein the weight equals a number of border routers of the selected administrative system connected to both peer administrative systems of the corresponding pair,
wherein the distance equals to a path distance between both sectors of the corresponding pair,
wherein the path distance of the corresponding pair is determined according to a position of both sectors of the corresponding pair in a circular linked list,
wherein the circular linked list is formed with a seed of three selected sectors,
wherein one or more additional sector is added to the circular linked list according to the total weighted distance that is minimized,
wherein the one or more sector is placed in the outer ring according to the position of the one or more sector in the circular linked list,
wherein the one or more first node is placed in the inner circle according to a first total distance that is minimized,
wherein the first total distance equals a sum of one or more angular difference of one or more first pair, each first pair comprising a first node and a sector wherein the corresponding border router is connected with the corresponding peer administrative system, wherein the plurality of second nodes are placed in the one or more sector according to a second total distance that is minimized, and wherein the second total distance equals a sum of one or more angular difference between a second node and one or more of the first node wherein the border router corresponding to the second node is connected with the one or more border router corresponding to the one or more first node.

25. The method of claim 23 further comprising the steps of:
selecting a representation item of the one or more graphical layout;
displaying one or more detail representation in real-time in response to the selection.

26. The method of claim 23 further comprising the step of playing back the one or more graphical layout off-line.

27. The method of claim 23 wherein the one or more network activity comprises BGP update, BGP event, BGP Event Classification, Network-to-Prefix Traffic Vector, prefix status, prefix instability, Netflow/Cflowd, IGP, router configuration, or syslogs files.

28. The method of claim 26 further comprising the step of annotating one or more representation item in an attribute according to the one or more network activity corresponding to the one or more representation item.

29. The method of claim 26 further comprising the steps of establishing one or more baseline in real-time according to the one or more network activity and generating one or more alert in real-time in response to the one or more baseline.

30. The method of claim 27 further comprising the step of generating one or more BGP cluster according to a temporal correlation or a spatial correlation of one or more BGP event.

31. The method of claim 29 further comprising the step of animating the one or more graphical layout in real-time wherein the one or more baseline is established according to Exponential Weighted Moving Average.

32. The system of claim 1,
wherein the one or more first node comprises a plurality of first nodes corresponding to a circular linked list,
wherein the distance measure comprises a weighted distance associated with a pair of first nodes in the plurality of first nodes,
wherein the weighted distance is determined based on a weight representing closeness between two first nodes in the pair of first nodes and a path distance between two entries in the circular linked list corresponding to the two first nodes in the plurality of the first nodes,
wherein the closeness between the two first nodes is determined based on connectivity from the two first nodes to the plurality of peer administrative systems according to the one or more router link, and
wherein correspondence between the plurality of first node and the circular linked list is determined based on minimizing the distance measure.

33. The system of claim 32,
wherein the weight is determined based on a number of common adjacent peer administrative systems connected to both of the two first nodes in the pair of first nodes according to the one or more router link, and
wherein adjacency of the peer administrative systems corresponds to adjacency of the plurality of portions in the second charting object.

34. The system of claim 1:
wherein the first weight comprises an angular difference between a first node in the plurality of first nodes and a portion in the plurality of portions of the second charting object, wherein the portion corresponds to a peer administrative system in the plurality of peer administrative systems, and
wherein the second weight comprises an angular difference between the first node and a second node in the plurality of second nodes.

* * * * *